INVENTOR.
Alexander E. Blair

United States Patent Office 3,513,696
Patented May 26, 1970

---

3,513,696
APPARATUS FOR DETERMINING THE RATE OF ASCENT OR DESCENT OF FREE OBJECTS IN A LIQUID MEDIUM
Alexander E. Blair, 75 Willow St.,
Marshfield, Mass. 02050
Filed Apr. 3, 1968, Ser. No. 718,418
Int. Cl. G01m 10/00
U.S. Cl. 73—148   6 Claims

ABSTRACT OF THE DISCLOSURE

This invention is a hydrodynamic test device consisting of a closed-loop conduit, one segment of which is a transparent test chamber having a vertical axis of flow. The device is primarily used to determine the rate of descent of objects having a specific gravity of more than 1 and rate of ascent of objects having a specific gravity of less than 1 in a liquid under varying simulated conditions of depth and temperature. By circulating the liquid through the test chamber in either direction at a rate which maintains the test object in stationary suspension, the rate of descent or ascent can be measured using a flow rate meter. Temperature conditions are simulated by heating or cooling the water to the desired temperature and depth conditions by a compressor and a bleed valve connected to the conduit. Other characteristics of the test object can be determined by sensors for the variables of interest or by observation.

BACKGROUND OF THE INVENTION

Field of the invention

The present invention relates to hydrodynamic test facilities for the experimental determination of hydrodynamic characteristics of objects, simulating actual conditions during free descent or ascent of such objects within a fluid medium. In particular, the rate of descent or ascent in a given liquid medium may be determined under conditions of varying temperature and varying pressures which simulate varying depths. Other characteristics of the test object may be determined using fluid dynamic sensing techniques or by visual observation. The conditions of descent or ascent are hereinafter referred to more generally as one of relative buoyancy, descending objects having negative buoyancy and ascending objects having positive buoyancy. Unless specified otherwise, buoyancy is taken as including both positive and negative buoyancies.

Description of the prior art

Prior art devices have been provided which are specifically directed at determining characteristics of objects moving horizontally through water either on or below the surface. In such devices the test object is restrained against depth changes due to buoyancy.

The prior art devices, such as shown in U.S. Pat. Nos. 3,333,465 to A. Goodman et al. and 3,028,688 to E. A. Ebert, utilize a horizontal test chamber wherein the axis of water flow is horizontal. The horizontal test chambers are not completely filled wherefore the water has a free surface. This surface is important because tests often involve a floating object, partly submerged or submerging objects or objects which alternately move in and out of the liquid (e.g., rotating propellers).

SUMMARY OF THE INVENTION

The present invention permits the determination of hydrodynamic characteristics and behavior of free objects in vertical motion in a liquid medium at varying depths and temperatures. It is applicable in the testing and design of objects such as ocean sounding equipment, bombs, depth charges, subsurface electronic equipment, etc., where the rate of ascent or descent due to buoyancy is desired.

Other hydrodynamic characteristics may be determined using fluid dynamic measuring techniques or by visual observation. For example, the hydrodynamic performance of a free test body may be evaluated as a function of fluid velocity by simply varying the weight of the test body. Since greater velocity will be required to maintain the heavier body suspended, the surface flow characteristics can be observed at different velocities.

The basic structure of the invention is a closed-loop conduit, a portion of which is a transparent test chamber having a vertical flow axis for the liquid. A circulating means is provided remote from the test chamber for establishing a smooth axial flow of the liquid.

The concept of operation is to establish a flow through the chamber precisely equal to the rate of descent or ascent which the test object would have under the simulated conditions. This is done by adjusting the flow rate until the object is in motionless equilibrium in the chamber. Such adjustment may be accomplished by a number of means; however, to achieve the necessary precision, a variable speed motor drive for the circulating means is preferable. The drive must be reversible in order to test objects having both positive and negative buoyancies.

In order to simulate conditions at varying depths and geographical locations, heating and cooling apparatus is installed as well as a compressor and pressure bleed valve.

DESCRIPTION OF THE PREFERRED EMBODIMENT

Figure 1:
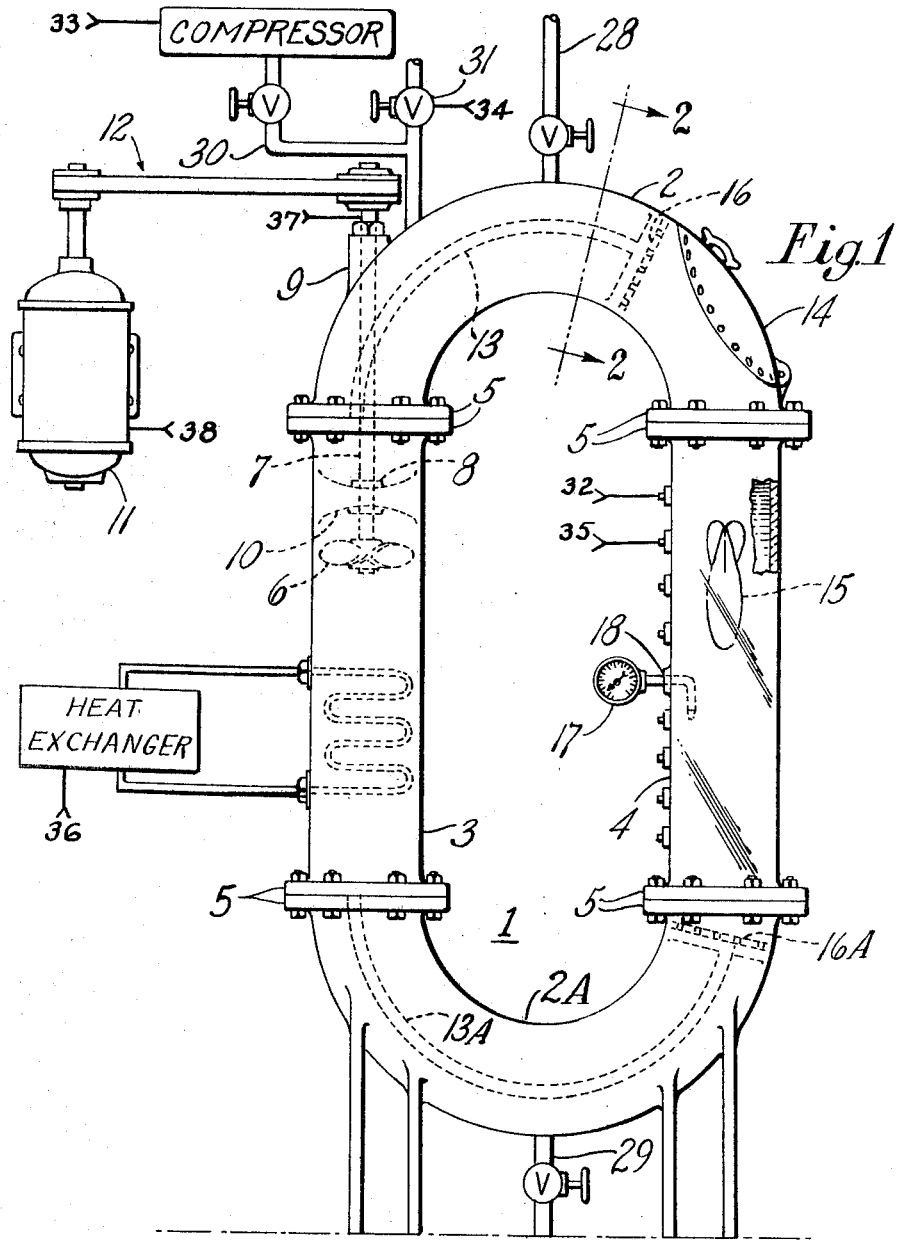
FIG. 1 is a side elevation view of the preferred embodiment.

Referring to FIG. 1, a closed-loop conduit 1 is composed of upper and lower curved segments 2 and 2a, a vertical return leg 3, and a vertical test chamber 4, all joined by mating flanges 5. A variety of configurations is possible for the loop, the only restriction being that the test chamber 4 have a vertical longitudinal axis so that when water is circulated in either direction around the loop, it flows vertically through the test chamber 4. The race track shape shown is considered most convenient.

Similarly, the cross-section of the conduit is preferably circular although a variety of shapes is possible.

Circulation is provided by an impeller 6 on a drive shaft 7 which is supported by an internal bearing 8 and an external bearing 9. An alignment strut 10 extends between the wall of the conduit 1 and the internal bearing 8, insuring proper positioning of the impeller 6 which is substantially coextensive with the conduit 1. The external bearing 9 is located in the upper curved segment 2, its axis aligned with the axis of the vertical return leg 3. This alignment provides smooth efficient circulation of water through the conduit 1.

The bearing 9 is appropriately sealed as in a stuffing box to permit water-tight exit of the drive shaft 7.

A reversible, variable speed motor drive 11 drives the impeller 6 through a belt and pulley system 12. Any of the conventional torque transfer means such as gears or chains would be equally suited.

Figure 2:
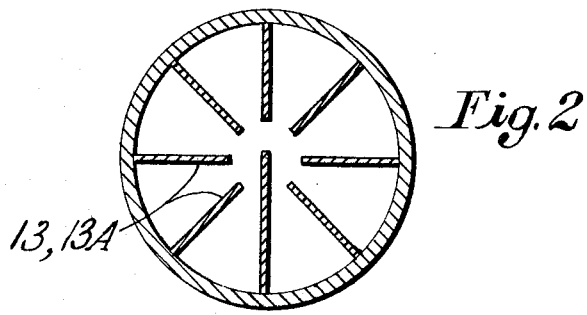
FIG. 2 is a sectional view through section 2—2 showing the guidevanes.

In order to provide axial flow into the test chamber 4, guidevanes 13 and 13a are fixed to the inside walls of the upper and lower curved segments 2 and 2a. FIG. 2 shows a typical arrangement of the guidevanes 13 and 13a.

A loading port 14 is provided in the upper curved segment 2 directly over the test chamber 4 for emplacing a test object 15 therein. Since this would take place in the absence of water circulation, a test object of negative buoyancy would tend to drop and a test object of positive buoyancy would tend to rise or float. Limit grates 16 and 16a are, therefore, provided generally above and below the test chamber 4 to contain the test object 15 in the vicinity of the test chamber 4 and to prevent its ingestion into the guidevanes 13 and 13a or the impeller 6.

A flow rate indicator 17 of the conventional type, calibrated to inches per minute, is connected to one of a series of instrument ports 18 in the test chamber 4. It is evident that any desired instrumentation could be similarly attached.

Figure 3:
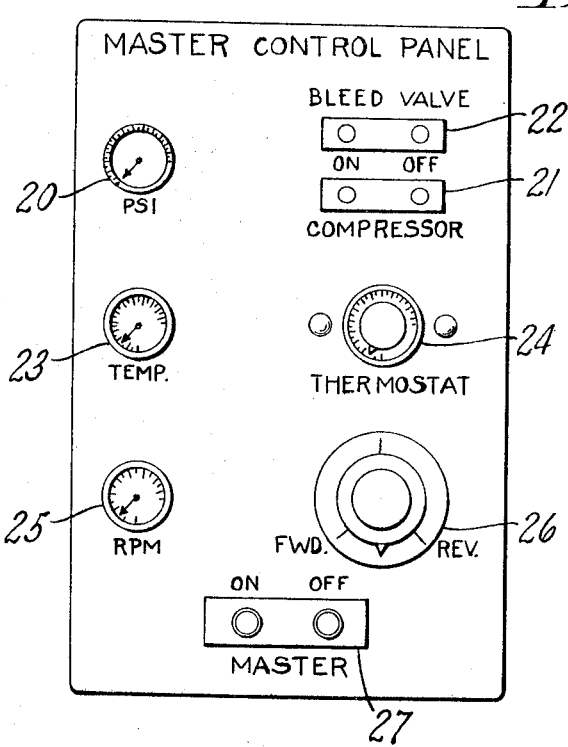
FIG. 3 is a view of the master control panel.

A motor control panel 19, shown in FIG. 3, contains various control devices and indicators connected as shown in FIG. 1 necessary for the basic operation of the apparatus.

In particular, the following are shown:

(a) A pressure gauge 20 connected to the test chamber 4 via line 32 to measure the internal pressure; a compressor control switch 21 connected via line 33 to operate the compressor and increase the internal pressure; and a bleed valve control switch 22 connected via line 34 to operate the bleed valve 31 and decrease the internal pressure.

(b) A temperature gauge 23 connected via line 35 to the test chamber 4 to measure the temperature of water flowing therethrough; a thermostatic control 24 connected via line 36 to the heat exchanger for varying the temperature of the water in the conduit by raising or lowering the temperature of the heat transfer medium filled coils.

(c) An impeller drive shaft speed indicator 25 connected via line 37 to the impeller drive shaft 7 to measure the speed thereof; a motor drive control 26 connected via line 38 to vary the speed and direction of the reversible, variable speed motor drive 11.

(d) A master power switch 27.

In a typical test, the conduit would initially be empty or filled to a level below the loading port 14. Filling is accomplished by means of a valve assembly 28 located uppermost on the upper curved segment 2 and draining is accomplished by means of a drain port and valve assembly 29 located at the lowest point of the lower curved segment 2a.

The test object 15 is lowered through the loading port 14 to either float on the surface or rest on the bottom limit grate 16a. The loading port 14 is closed and the conduit 1 is completely filled with water.

If the test is to be initiated at a simulated depth other than at, or close to, the surface of the compressor, connected through a valve assembly 30, is run until the pressure gauge 20 indicates the desired pressure.

The motor drive 11 is then started to circulate the water in the appropriate direction depending upon whether the test object 15 has positive or negative buoyancy. By adjustment of the motor drive control 26, the test object 15 is brought to equilibrium in the test chamber 4. Temperature variations may be made concurrently with the above steps by adjustment of the thermostatic control 24 as explained above.

After temperature and pressure equilibrium is established, final adjustments of the motor drive 11 are made to achieve precise equilibrium of the test object 15.

At this point, the desired simulated condition having been established, the precise rate of ascent or descent of the test object is read directly from the flow rate indicator 17.

By visual observation hydrodynamic behavior of the object can be determined, in particular, stability in motion, flexure and undulation if a non-rigid test object is involved, spin, either intentional or undesired, etc.

The test object itself may be instrumented to measure stress, strain, spin accelerations and velocities, etc.

For successive simulated conditions, pressure and temperature changes are effected, equilibrium is achieved and readings again made. Where decreasing pressure increments are to be employed, pressure bleed valve assembly 31 is used.

It is intended to cover all changes and modifications of the preferred embodiment herein chosen for purposes of the disclosure which do not constitute departures from the spirit and scope of the invention.

I claim:

1. A method for determining the ascent and descent behavior of a free object in a liquid medium comprising:
   placing a free object in a test chamber;
   flowing a liquid test medium vertically through said test chamber;
   allowing said object to respond freely to said flowing liquid simulating actual conditions during free descent or ascent;
   adjusting the rate and direction of flow of said liquid to balance the rate of ascent or descent of said object in said liquid so that said object stays within said test chamber in a free fall condition;
   determining the rate and direction of liquid flow in said test chamber when said balance is achieved; and
   detecting the free fall hydrodynamic characteristics of said object in said balance condition within said test chamber.

2. An apparatus for precisely determining the rate of vertical movement of free objects of varying buoyancies through a liquid comprising:
   a closed-loop conduit having inlet and outlet means for a liquid test medium;
   a test chamber integrally disposed in said conduit for vertical flow of said liquid therethrough and having a transparent viewing portion;
   means for emplacing an object in said test chamber;
   means for establishing a flow of said liquid over a predetermined range of flow rates through said conduit, such that said object may be suspended in equilibrium in said test chamber;
   a flow rate sensing and indicating means communicating with liquid flowing through said test chamber, for measuring the rate of flow thereof, said rate being equal to the rate of vertical movement of said object; and
   means for controllably varying the pressure of said liquid within said conduit.

3. The apparatus of claim 2 wherein said pressure varying means comprises a port in said conduit communicating alternatively with a compressor and a bleed valve.

4. An apparatus for precisely determining the rate of vertical movement of free objects of varying buoyancies through a liquid comprising:
   a closed-loop conduit having inlet and outlet means for a liquid test medium;
   a test chamber integrally disposed in said conduit for vertical flow of said liquid therethrough and having a transparent viewing portion;
   means for emplacing an object in said test chamber;
   means for establishing a flow of said liquid over a predetermined range of flow rates through said conduit, such that said object may be suspended in equilibrium in said test chamber;
   a flow rate sensing and indicating means communicating with liquid flowing through said test chamber, for measuring the rate of flow thereof, said rate being equal to the rate of vertical movement of said object; and
   heat transfer medium filled coils inside said conduit and extending through the walls thereof to communicate with external heat exchange means for controllably varying the temperature of said liquid within said conduit.

5. An apparatus for precisely determining the rate of vertical movement of free objects of varying buoyancies through a liquid comprising:
- a closed-loop conduit having inlet and outlet means for a liquid test medium;
- a test chamber integrally disposed in said conduit for vertical flow of said liquid therethrough and having a transparent viewing portion;
- means for emplacing an object in said test chamber;
- an impeller disposed in said conduit and substantially coextensive therewith for establishing flow of said liquid around said closed-loop conduit;
- a drive shaft connected to said impeller and extending through said conduit;
- a reversible variable speed drive motor connected to said drive shaft;
- guidevanes downstream of said impeller for establishing axial flow of said liquid; and
- a flow rate sensing and indicating means communicating with liquid flowing through said test chamber, for measuring the rate of flow thereof, said rate being equal to the rate of vertical movement of said object.

6. The apparatus of claim 5 wherein said closed-loop conduit comprises:
- an elongated walled enclosure having substantially semi-circular upper and lower legs connected by vertical legs, one of said vertical legs comprising said test chamber; and
- two limit grates across the flow axis of said conduit and co-extensive therewith disposed one at each extremity of said test chamber for preventing the inadvertent movement of said object into said flow establishing means.

References Cited

UNITED STATES PATENTS

| | | | |
|---|---|---|---|
| 1,780,952 | 11/1930 | Symmes | 73—57 |
| 2,552,552 | 5/1951 | Head | 73—209 |
| 2,800,019 | 7/1957 | Rumble | 73—209 |
| 2,831,345 | 4/1958 | Wolf et al. | 73—148 X |
| 3,333,465 | 8/1967 | Goodman et al. | 73—148 |

FOREIGN PATENTS 158,143    1963    Russia.

LOUIS R. PRINCE, Primary Examiner

H. C. POST III, Assistant Examiner

U.S. Cl. X.R.

73—57, 209